United States Patent
Kumar et al.

(10) Patent No.: US 8,755,805 B2
(45) Date of Patent: Jun. 17, 2014

(54) METHODS FOR GENERATING RADIO FREQUENCY MAPS OF NETWORKS

(75) Inventors: Gopal N. Kumar, Bridgewater, NJ (US); Victor Dasilva, Succasunna, NJ (US); Benjamin Cheung, Berkeley Heights, NJ (US); Tracey G. Dwyer, Wayne, NJ (US); Padma Sudarsan, Naperville, IL (US); Brahm Parasher, Parsippany, NJ (US)

(73) Assignee: Alcatel Lucent, Paris (FR)

( * ) Notice: Subject to any disclaimer, the term of this patent is extended or adjusted under 35 U.S.C. 154(b) by 276 days.

(21) Appl. No.: 13/236,019

(22) Filed: Sep. 19, 2011

(65) Prior Publication Data

US 2012/0220295 A1 Aug. 30, 2012

Related U.S. Application Data

(60) Provisional application No. 61/388,368, filed on Sep. 30, 2010.

(51) Int. Cl.
*H04B 17/00* (2006.01)
*H04W 4/00* (2009.01)
*H04W 24/00* (2009.01)
*H04W 40/00* (2009.01)

(52) U.S. Cl.
USPC ............ 455/446; 445/67.11; 445/422.1; 445/425; 445/434

(58) Field of Classification Search
CPC ..... H04W 16/00; H04W 16/02; H04W 16/18; H04W 16/14; H04W 16/24; H04W 24/00; H04W 24/06; H04W 24/10; H04W 88/02; H04W 88/06; H04W 88/10; H04W 88/085

USPC ........ 455/67.11, 67.14, 422.1, 423–425, 434, 455/446–448, 550.1, 561
See application file for complete search history.

(56) References Cited

U.S. PATENT DOCUMENTS

| | | | |
|---|---|---|---|
| 2002/0123341 A1* | 9/2002 | Iyer | 455/426 |
| 2002/0147720 A1* | 10/2002 | Iyer | 707/10 |
| 2003/0078051 A1* | 4/2003 | Fattouch | 455/452 |
| 2004/0259554 A1* | 12/2004 | Rappaport et al. | 455/446 |
| 2007/0010241 A1* | 1/2007 | Wachter et al. | 455/423 |
| 2007/0054670 A1* | 3/2007 | Kalika et al. | 455/446 |

OTHER PUBLICATIONS

Fager et al., "Pixel-Based Reconstruction (PBR) Promising Simultaneous Techniques for CT Reconstructions", IEEE Transactions on Medical Imaging, vol. 12, No. 1, Mar. 1993.

International Search Report and Written Opinion dated Apr. 11, 2012 for PCT/US2011/054112.

(Continued)

*Primary Examiner* — Meless Zewdu
(74) *Attorney, Agent, or Firm* — Harness, Dickey & Pierce (57) ABSTRACT

At least one example embodiment discloses a method of generating a radio frequency (RF) map of a network. The method includes obtaining, by a controller, received signal strengths of at least one user equipment (UE) in a first technology network, determining, by the controller, a back projection of a second technology network based on the received signal strengths, and generating, by the controller, an RF map of the second technology network based on the determining. The back projection represents an attenuation function of a coverage area of the second technology network and the RF map illustrates the attenuation function of the coverage area of second technology network.

19 Claims, 6 Drawing Sheets

(56) References Cited

OTHER PUBLICATIONS

3$^{rd}$ Generation Partnership Project; Technical Specification Group Radio Access Network; Study on Minimization of drive-tests in Next Generation Networks; (Release 9), 3GPP Standard; 3GPP TR 36.805, V9.0.0 (Dec. 2009), pp. 1-24, XP050401520.

3$^{rd}$ Generation Partnership Project; Technical Specification Group TSG RAN Universal Terrestrial Radio Access (UTRA) and Evolved Universal Terrestrial Radio Access (E-UTRA); Radio Measurement collection for Minimization of Drive Tests (MDT); Overall Description; Stage 2 (Release 10), 3GPP TS 37.320; V1.0.0, (Aug. 2010), XP050452266.

* cited by examiner

METHODS FOR GENERATING RADIO FREQUENCY MAPS OF NETWORKS

PRIORITY STATEMENT

This application claims the benefit of U.S. Provisional Application No. 61/388,368, filed Sep. 30, 2010, the entire contents of which are incorporated herein by reference.

BACKGROUND

Figure 1A:
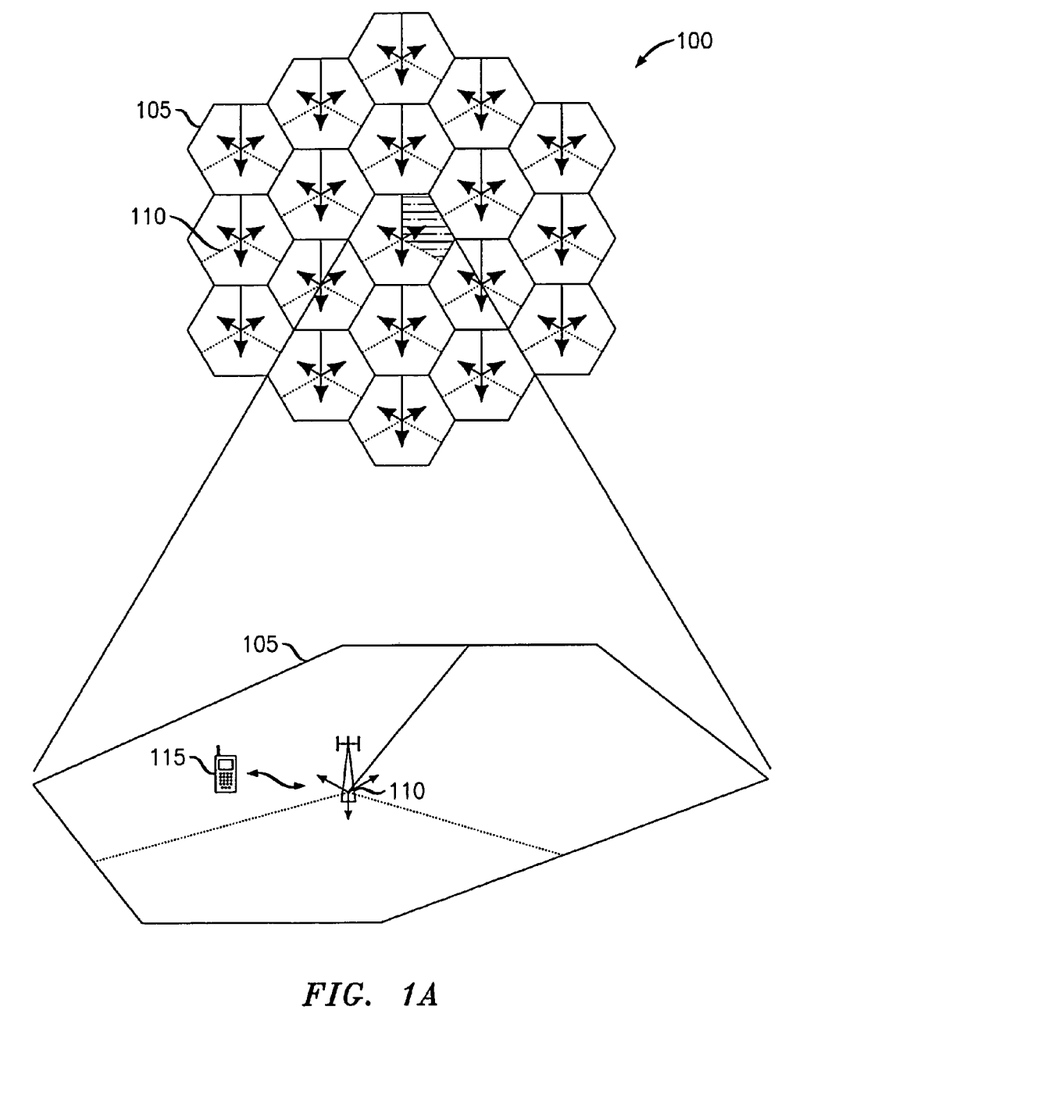
FIG. 1A illustrates a conventional heterogeneous network.

FIG. 1A illustrates a conventional heterogeneous network 100. As shown, a plurality of cells 105 are arranged in a hexagonal grid of cells. A base station 110 serves each of the plurality of cells 105. A user equipment (UE) 115 within the cell 105 may communicate with the base station 110.

The network 100 may implement Global System for Mobile Communications (GSM), General Packet Radio Service (GPRS), Universal Mobile Telecommunications System (UMTS), High-Speed Downlink Packet Access (HSDPA), High-Speed Uplink Packet Access (HSUPA) and/or Long Term Evolution (LTE) wireless macro cellular standards.

Traditionally, network optimization has depended heavily on drive testing critical markets at the advent of a new technology or when significant growth happens.

Drive tests involve gathering radio frequency (RF) information from the UE 115 at various drive route locations. Typically, these are received signal strengths of the pilots (RSRP) and signal to interference-plus-noise ratio (SINR or RSRQ) of various cells 105 "visible" at a location of the UE 115. The signal strengths and SINRs are then manually analyzed around areas where calls degrade or drop to estimate good network parameter values to mitigate these problems.

SUMMARY

Example embodiments are directed to generating radio frequency (RF) maps for networks. Old test drive data may used by a controller of a network to generate an RF map which can then be used by intelligent algorithms to provide network parameter values throughout the network. This reduces new drive test needs while providing a way to improve network performance.

At least one example embodiment discloses a method of generating a radio frequency (RF) map of a network. The method includes obtaining, by a controller, received signal strengths of at least one user equipment (UE) in a first technology network, determining, by the controller, a back projection of a second technology network based on the received signal strengths, and generating, by the controller, an RF map of the second technology network based on the determining. The back projection represents an attenuation function of a coverage area of the second technology network and the RF map illustrates the attenuation function of the coverage area of second technology network.

At least one example embodiment discloses a method of generating a radio frequency (RF) map of a first network. The method includes obtaining, by a controller, test data for a second network, determining, by the controller, a back projection of the network based on the test data, and generating, by the controller, an RF map of the first network based on the determining. The back projection represents an attenuation function of a coverage area of the first network and the RF map illustrates an attenuation function of a coverage area of the first network.

BRIEF DESCRIPTION OF THE DRAWINGS

Example embodiments will be more clearly understood from the following detailed description taken in conjunction with the accompanying drawings. FIGS. 1A-5 represent non-limiting, example embodiments as described herein.

DETAILED DESCRIPTION

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler located at a cell site, base station or Node B). Such existing hardware may include one or more controllers, Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

As used herein, the term "user equipment" (UE) may be synonymous to a mobile user, mobile station, mobile terminal, user, subscriber, wireless terminal and/or remote station and may describe a remote user of wireless resources in a wireless communication network.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

At least one example embodiment discloses a method for generating an RF map over a network area. The method provides a way to adjust parameters for better performance even in areas that don't see performance problems. Traditional drive test data analysis has been confined to mitigating problems in specific areas but not to improving performance in other "problem-free" areas.

The method may be performed by a controller of the network. The controller may be any centralized element. The controller may be part of a network management layer of an LTE network such as a Mobility Management Entity (MME). The generated RF map is used by the controller of the communication system to improve network performance. For example, handoff parameters, reselection parameters, neighbor lists, reference signal strength, antenna tilts and power-offsets may be adjusted based on the generated RF map.

Figure 1B:
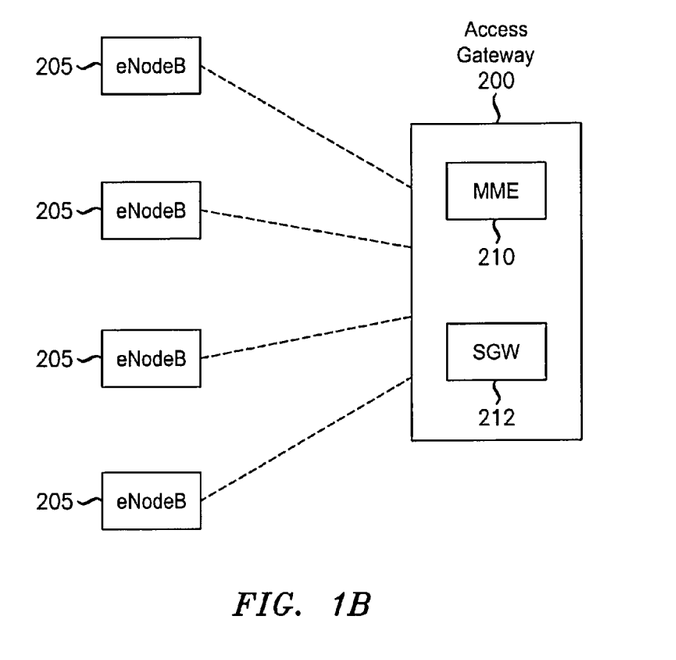
FIG. 1B shows a portion of an LTE network according to at least one example embodiment.

For example, FIG. 1B shows a portion of an LTE deployment including a network management layer 200 in communication with a plurality of eNodeBs 205. As is well-known, multiple cells or a single cell are often associated with a single eNodeB.

The LTE network management layer 200 includes a MME 210 and a serving gateway SGW 212. The MME 210 is a logical entity that controls the eNodeBs 205 and coordinates scheduling and transmission for eNodeBs 205. In more detail, functions of the MME 210 include scheduling and timing control, eNodeB registration and feedback. The MME 210 is in two-way communication with the eNodeBs 205.

The MME 210 controls a UE's tracking and reachability. The MME 210 also controls and executes transmission and/or retransmission of signaling messages such as paging messages for notifying destination UEs of impending connection requests (e.g., when UEs are being called or when network initiated data intended for the UE is coming).

Construction of RF Map

In a network, a UE's received signal strength of a pilot depends on the transmit power of the pilot at the appropriate base station (BS), locations of the BS and the UE, and the RF property along the path the RF energy travels between the BS and the UE.

Energy gets attenuated in accordance with an RF attenuation coefficient along the RF path. In at least one example embodiment, the attenuation coefficient is reconstructed in the RF map.

A method according to at least one example embodiment renders an image of the reconstructed attenuation coefficients for locations in the network by working mathematically on the received signal strengths measured by the UE and back-projecting the net attenuation perceived at the UE along the path the RF energy travels. This attenuation process along the path is described mathematically by a Radon transform.

Figure 2:
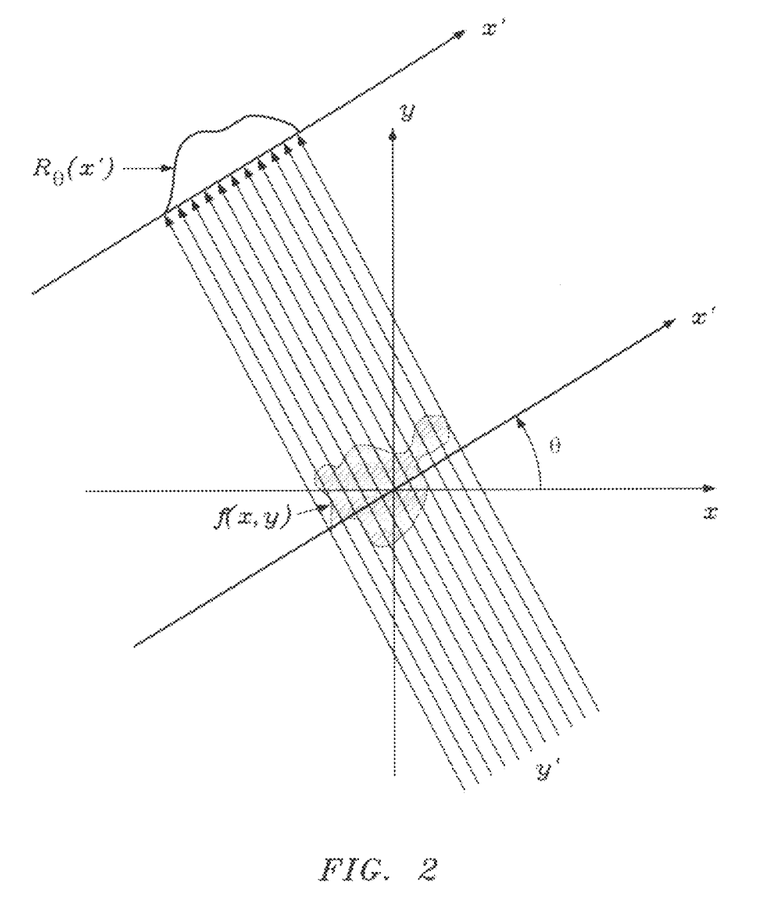
FIG. 2 illustrates a Radon transform according to at least one example embodiment.

FIG. 2 illustrates a diagrammatic depiction of a Radon transform $R_\theta(x')$. In FIG. 2, the Radon transform $R_\theta(x')$ of an attenuation function $f(x,y)$ is as follows:

$$R_\theta(x') = \int_{-\infty}^{\infty} f(x' \cos\theta - y' \cos\theta, x' \sin\theta + y' \cos\theta) dy' \tag{1}$$

In FIG. 2, the sampling is uniform. The inventors of the present application have discovered that received signal strengths are Radon transforms of the attenuation coefficient function $f(x,y)$ and an inverse Radon transform of the received signal strengths will provide the values of the attenuation coefficient function f(x,y) at the grid resolution into which the whole network is divided.

In wireless communications, the relationship between the transmitter (the BS) and the receiver (UE) is complex. To counter this, algebraic methods together with adaptive filtering techniques are used to reconstruct the attenuation coefficient function f(x,y).

Figure 3:
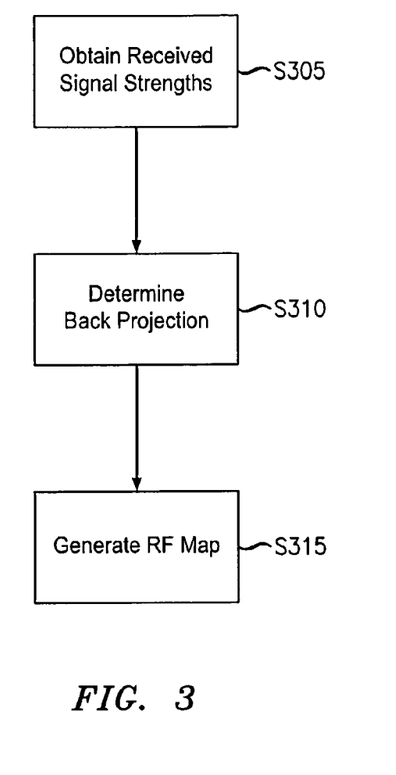
FIG. 3 illustrates a method of generating a radio frequency (RF) map of a first network according to at least one example embodiment.

FIG. 3 illustrates a method of generating a radio frequency (RF) map of a first network according to at least one example embodiment. The method may be performed by a controller of a first network. The controller may utilize drive test data from a second network when there is an overlap between coverage areas of the first and second networks. For example, the MME 210 (shown in FIG. 1B) may use drive test data from the network 100 (shown in FIG. 1A) if the network in FIG. 1A covers an area that overlaps at least a portion of the network in FIG. 1B.

At S305, the controller obtains received signal strengths of at least one UE. The received signal strengths may be obtained from a previous drive test for a second network (e.g., an older network). For example, if a network initiation is for an LTE network, the controller may obtain the received signal strengths from a drive test for a UMTS network covering at least a portion of a coverage area of the LTE network. Consequently, the controller may base the RF map on previously collected drive test data and another drive test is not required.

At S310, the controller determines a back projection of the received signal strengths. The controller may apply the received signal strengths of the second network to the first network (e.g., new network) by using known access channel protocols and transmitted pilot powers to calibrate the old drive test data (received signal strengths).

As should be understood, the inverse Radon transform may be referred to as a Fourier space algorithm. Moreover, the term "back projection" covers both Fourier and algebraic techniques.

Figure 4:
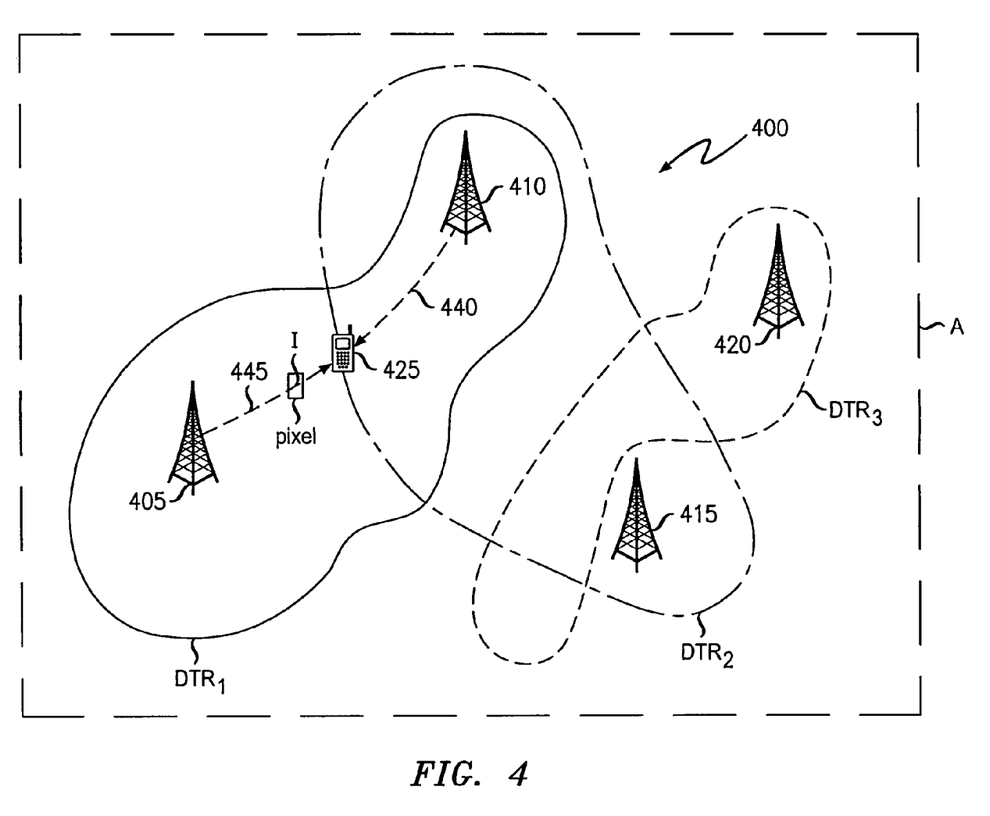
FIG. 4 illustrates a second network covering an area according to at least one example embodiment.

Step S310 is described with reference to FIG. 4. FIG. 4 illustrates a second network 400 covering an area A. The network 400 includes base stations 405, 410, 415 and 420. While only four base stations 405, 410, 415 and 420 are illustrated, it should be understood that the second network 400 may include more or less than four base stations.

Moreover, the second network 400 includes three drive test routes $DTR_1$, $DTR_2$ and $DTR_3$ that have been performed within the coverage area A of the second network 400. A UE 425 is within the second network 400. During the drive test route $DTR_2$, the base stations 405 and 410 transmit pilot signals to the UE 425 over RF paths 445 and 440, respectively. The UE 425 responds to the pilot signals indicating received signal strengths at the UE 425. Based on a received signal strength, a controller may calculate the pathloss by subtracting the received signal strength from the transmit power of the pilot signal.

Based on the received signal strengths obtained during the drive test routes $DTR_1$, $DTR_2$ and $DTR_3$, a controller for the first network may perform a back projection on the received signal strengths to generate an attenuation coefficient function for the area A covered by the second network 400. In other words, the inventors have discovered that the received signal strengths are the Radon transforms of the attenuation coefficient function.

The controller may use any type of back projection to determine the attenuation function for the area A covered by the second network 400. FIG. 4 illustrates where the back projection used is a pixel-based reconstruction.

As shown in FIG. 4, a pixel is along the RF path 445. In pixel-based reconstruction, square pixels may run along the entire RF path 445. A portion of the RF path 445 runs through each pixel. A length of the portion of the RF path 445 that runs through the pixel may be referred to as I. In pixel-based reconstruction, pathloss is evenly divided among the path.

Using pixel-based reconstruction, the pathloss exponent at a point (x,y) can be defined as:

$$\Lambda(x, y) = T\left(\left[\frac{1}{N(x, y)} \sum_{j \in S(x,y)} \left(\frac{P_j}{d_j} \times I(j, x, y)\right)\right], f\right) \quad (2)$$

where S(x,y) is a set of all RF paths through the point (x,y), Pj is the pathloss of path j to the UE (e.g., path 445), $d_j$ is the distance of path j, N(x,y) is a cardinality of the set S(x,y), T is a tomographic inverse-mapping (such as pixel-based reconstruction), f is the frequency band of operation for the drive test data.

The pathloss exponent $\Lambda(x,y)$ may also be referred to as the physical attenuation property or the attenuation coefficient at (x,y).

The tomographic inverse-mapping may be any known back projection method. For example, the pixel-based reconstruction described in Fager et al., *Pixel-Based Reconstruction (PBR) Promising Simultaneous Techniques for CT Reconstruction*, IEEE Transactions on Medical Imaging, Vol. 12, No. 1, March 1993 may be used, the entire contents of which are hereby incorporated by reference.

While FIG. 4 illustrates a more specific application of determining a back projection, the controller may apply the following back projection scheme in general:

$$\delta(x, y, c, p) = B(D(c, p)) = \frac{D(c, p)}{|L_{c,p}|} \quad (3)$$

$$f(x, y) = \Psi\left(\sum_{x,y \in L_{c,p}} \delta(x, y, c, p)\right) \quad (4)$$

where B(*) is the back projection function (e.g., inverse Radon transform), D(c,p) is the pathloss measurement from a base station c to a point of the UE p, $L_{c,p}$ is a line segment between a base station c and a point of the UE p, δ is a sum of the lengths of RF paths through the pixel at (x,y), and f(x,y) is the pathloss exponent (same as $\Lambda(x,y)$).

With reference back to FIG. 3, the controller then generates an RF map for the first network, at S315, based on the determined back projection and more specifically, the pathloss exponent $\Lambda(x,y)$. An example RF map according to at least one example embodiment is shown in FIG. 5.

Figure 5:
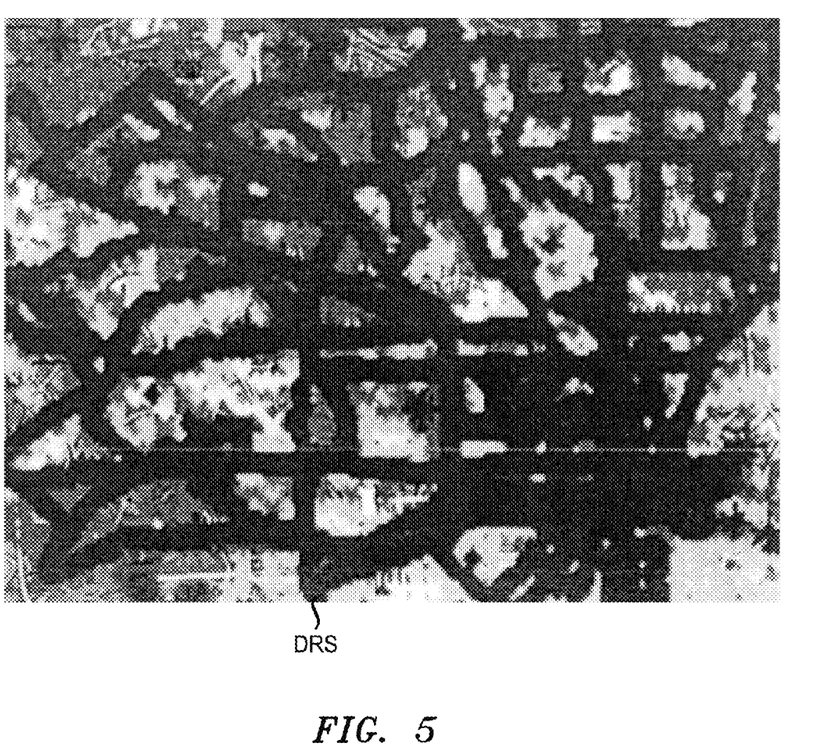
FIG. 5 illustrates an example RF map according to at least one example embodiment.

FIG. 5 illustrates a generated RF map according to at least one example embodiment. In FIG. 5, the dark lines represent drive test routes DRS. The different shades between the drive routes DRS represent attenuation coefficients. The shade indicates the attenuation coefficient, with the lightest shade representing the lowest attenuation coefficient and the darkest shade representing the highest attenuation coefficient. As should be appreciated, different colors may used instead of different shades. After the controller generates the RF map, the controller may adjust the parameters for the first network such as handoff parameters, reselection parameters, neighbor lists, reference signal strength, antenna tilts and power-offsets.

One benefit of example embodiments is the ability to use old drive test data for improving new technology with little to no new drive tests. This provides substantial cost and time savings. Moreover, initial performance values based on the generated RF maps are close or the same as actual optimal values. The actual performance values are reached via iterative refinements by self optimizing network (SON) algorithms which almost always use some form of steepest descent search. If the initial values are chosen unwittingly in the wrong optimal well, then steepest descent based SON will provide only sub-optimal solutions.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of generating a radio frequency (RF) map of a network, the method comprising:
    obtaining, by a controller, received signal strengths of at least one user equipment (UE) in a first technology network;
    determining, by the controller, a back projection of a second technology network based on the received signal strengths, the back projection representing an attenuation function of a coverage area of the second technology network; and
    generating, by the controller, an RF map of the second technology network based on the determining, the RF map illustrating the attenuation function of the coverage area of the second technology network.

2. The method of claim 1, wherein determining the back projection is based on an inverse Radon transform function.

3. The method of claim 2, wherein the received signal strengths represent a Radon transform of the attenuation function of the second technology network.

4. The method of claim 1, wherein the obtaining includes obtaining the received signal strengths during a first drive test.

5. The method of claim 4, wherein the generating generates the RF map without a second drive test.

6. The method of claim 1, further comprising:
    transmitting a pilot before the obtaining, the received signal strength being based on a transmit power of the pilot.

7. The method of claim 1, wherein the generating generates the RF map, the RF map representing attenuation coefficients associated with locations in second technology network.

8. The method of claim 1, wherein the determining determines the back projection, the back projection representing the attenuation function for the second technology network.

9. The method of claim 1, wherein the first technology network and the second technology network have overlapping coverage areas.

10. A method of generating a radio frequency (RF) map of a first network, the method comprising:
    obtaining, by a controller, test data for a second network;
    determining, by the controller, a back projection of the network based on the test data, the back projection representing an attenuation function of a coverage area of the first network; and
    generating, by the controller, an RF map of the first network based on the determining, the RF map illustrating an attenuation function of a coverage area of the first network.

11. The method of claim 10, wherein determining the back projection is based on an inverse Radon transform function.

12. The method of claim 10, wherein the test data are received signal strengths of at least one user equipment (UE).

13. The method of claim 10, wherein the obtaining includes obtaining the received signal strengths during a first drive test.

14. The method of claim 13, wherein the generating generates the RF map without a second drive test.

15. The method of claim 10, further comprising:
    transmitting a pilot before the obtaining, the test data being based on a transmit power of the pilot.

16. The method of claim 10, wherein the generating generates the RF map, the RF map representing attenuation coefficients associated with locations in the first network.

17. The method of claim 10, wherein the determining determines the back projection, the back projection representing the attenuation function for the first network.

18. The method of claim 10, wherein the first network is a LTE network and the second network is a UMTS network.

19. The method of claim 10, wherein the first network and the second network have overlapping coverage areas.

* * * * *